United States Patent
Bhatia et al.

(10) Patent No.: US 7,840,895 B2
(45) Date of Patent: Nov. 23, 2010

(54) SYSTEM AND METHOD FOR DATA MANIPULATION

(75) Inventors: Rishi Bhatia, Walpole, MA (US); Matthew J. Schulze, Glen Ellyn, IL (US); John M. Tomaszewski, Villa Park, IL (US); Robert B. Kittredge, Newton, MA (US); Davanum Srinivas, Sharon, MA (US)

(73) Assignee: Computer Associates Think, Inc., Islandia, NY (US)

( * ) Notice: Subject to any disclaimer, the term of this patent is extended or adjusted under 35 U.S.C. 154(b) by 381 days.

(21) Appl. No.: 11/135,000

(22) Filed: May 23, 2005

(65) Prior Publication Data

US 2006/0200439 A1    Sep. 7, 2006

Related U.S. Application Data

(60) Provisional application No. 60/659,264, filed on Mar. 7, 2005.

(51) Int. Cl.
G06F 17/00    (2006.01)
(52) U.S. Cl. .................. 715/239; 715/249; 707/763
(58) Field of Classification Search .............. 707/763; 715/239, 249
See application file for complete search history.

(56) References Cited

U.S. PATENT DOCUMENTS

| | | | |
|---|---|---|---|
| 5,539,378 A | 7/1996 | Chang | 340/542 |
| 5,627,979 A | 5/1997 | Chang et al. | 395/335 |
| 5,734,905 A | 3/1998 | Oppenheim | 395/683 |
| 5,991,731 A | 11/1999 | Colon et al. | 705/3 |
| 6,199,068 B1* | 3/2001 | Carpenter | 707/100 |
| 6,356,920 B1* | 3/2002 | Vandersluis | 715/210 |
| 6,529,909 B1 | 3/2003 | Bowman-Amuah | 707/10 |
| 6,590,589 B1* | 7/2003 | Sluiman et al. | 715/751 |
| 6,598,219 B1* | 7/2003 | Lau | 717/108 |
| 6,601,071 B1 | 7/2003 | Bowker et al. | 707/102 |
| 6,782,403 B1 | 8/2004 | Kino et al. | 707/203 |
| 6,792,605 B1 | 9/2004 | Roberts et al. | 719/313 |
| 6,799,184 B2 | 9/2004 | Bhatt et al. | 707/102 |
| 6,823,495 B1 | 11/2004 | Vedula et al. | 715/805 |
| 7,058,645 B2 | 6/2006 | Seto et al. | 707/101 |
| 7,159,185 B1* | 1/2007 | Vedula et al. | 715/763 |
| 2002/0026461 A1* | 2/2002 | Kutay et al. | 707/523 |
| 2002/0129059 A1 | 9/2002 | Eck | 707/513 |

(Continued)

OTHER PUBLICATIONS

Yongquiang Li et al. ("A Data Mapping Specification Environment Using a Concrete Business Form-Based Metaphor," IEEE, 2002 pp. 158-166).*

(Continued)

*Primary Examiner*—John R. Cottingham
*Assistant Examiner*—Alexandria Y Bromell
(74) *Attorney, Agent, or Firm*—Baker Botts L.L.P.

(57) ABSTRACT

In one embodiment of the invention, a system for data manipulation includes a mapper module operable to receive a first data format of a source file, receive a second data format of a target file, and automatically generate a script to represent a movement of data from the source file to the target file. A server is operable to execute the script, a first interface module is coupled to the source file and is operable to load the data in accordance with the script, and a second interface module is coupled to the target file and is operable to store the data in accordance with the script.

20 Claims, 8 Drawing Sheets

U.S. PATENT DOCUMENTS

| | | | |
|---|---|---|---|
| 2002/0174098 A1 | 11/2002 | Wu et al. | 707/1 |
| 2002/0184213 A1* | 12/2002 | Lau et al. | 707/6 |
| 2003/0018661 A1 | 1/2003 | Darugar | 707/500 |
| 2003/0046288 A1 | 3/2003 | Severino et al. | 707/10 |
| 2003/0070144 A1* | 4/2003 | Schnelle et al. | 715/513 |
| 2003/0167254 A1 | 9/2003 | Su et al. | 707/1 |
| 2003/0167445 A1 | 9/2003 | Su et al. | 715/513 |
| 2003/0193521 A1 | 10/2003 | Chen et al. | 345/762 |
| 2004/0015523 A1 | 1/2004 | Guest et al. | 707/204 |
| 2004/0060003 A1 | 3/2004 | Mani et al. | 715/513 |
| 2004/0060004 A1 | 3/2004 | Mani et al. | 715/513 |
| 2004/0148270 A1 | 7/2004 | McKay et al. | 707/1 |
| 2004/0193759 A1 | 9/2004 | Scott et al. | 710/36 |
| 2004/0205452 A1 | 10/2004 | Fitzsimons | 715/500 |
| 2004/0205562 A1 | 10/2004 | Rozek et al. | 715/513 |
| 2005/0027743 A1* | 2/2005 | O'Neil et al. | 707/104.1 |
| 2005/0060340 A1* | 3/2005 | Sommerfield et al. | 707/102 |
| 2005/0097147 A1 | 5/2005 | Hunt et al. | 707/200 |
| 2005/0132282 A1 | 6/2005 | Panditharadhya et al. | 715/516 |
| 2005/0149536 A1 | 7/2005 | Wildes et al. | 707/100 |
| 2005/0149552 A1 | 7/2005 | Chan et al. | 707/102 |
| 2005/0257193 A1 | 11/2005 | Falk et al. | 717/109 |
| 2006/0156314 A1 | 7/2006 | Waldorf | 719/328 |
| 2006/0200499 A1 | 9/2006 | Bhatia et al. | 707/200 |
| 2006/0200739 A1 | 9/2006 | Bhatia et al. | 715/500 |
| 2006/0200747 A1 | 9/2006 | Bhatia et al. | 715/500 |
| 2006/0200753 A1 | 9/2006 | Bhatia et al. | 715/505 |
| 2007/0220022 A1 | 9/2007 | Lankinen et al. | 707/101 |
| 2008/0010629 A1* | 1/2008 | Berg et al. | 717/116 |

OTHER PUBLICATIONS

PCT Notification of Transmittal of The International Search Report and The Written Opinion of the International Searching Authority, or the Declaration, in International Application No. PCT/US2006/008131, dated Jun. 26, 2006, 10 pgs.

PCT Notification of Transmittal of the International Search Report and the Written Opinion of the International Searching Authority, or the Declaration with attached Search Report and Written Opinion in International Application No. PCT/US2006/008014, dated Jul. 19, 2006, 10 pages.

PCT International Notification of Transmittal of the International Search Report and the Written Opinion of the International Searching Authority, or the Declaration with attached PCT International Search Report and Written Opinion of the International Searching Authority in International Application No. PCT/US2006/008015, dated Aug. 11, 2006, 9 pages.

Shengru Tu et al. "Design Strategies to Improve Performance of GIS Web Services," Proceedings of the International Conference on Information Technology: Coding and Computing (ITCC '04), *IEEE* 2004, 5 pages.

Notification of Transmittal of the International Search Report and the Written Opinion of the International Searching Authority, or the Declaration mailed Aug. 18, 2006 in reference to PCT/US2006/008013 filed Mar. 7, 2006, 10 pp.

Notification of Transmittal of the International Search Report and the Written Opinion of the International Searching Authority, or the Declaration mailed Aug. 3, 2006 in reference to PCT/US2006/007991 filed Mar. 7, 2006, 11 pp.

Bhatia, *System and Method for Data Manipulation*, U.S. Appl. No. 11/134,993, filed May 23, 2005, Official communication from US PTO dated Jul. 6, 2007.

Bhatia, *System and Method for Data Manipulation*, U.S. Appl. No. 11/134,993, filed May 23, 2005, Official communication from US PTO dated Dec. 13, 2007.

Bhatia, *System and Method for Data Manipulation*, U.S. Appl. No. 11/134,993, filed May 23, 2005, Official communication from US PTO dated Mar. 31, 2008.

Bhatia, *System and Method for Data Manipulation*, U.S. Appl. No. 11/134,993, filed May 23, 2005, Official communication from US PTO dated Oct. 20, 2008.

Tova Milo, et al.; *Using Schema Matching to Simplify Heterogeneous Data Translation*; Proceedings of the 24th VLDB Conference; pp. 122-133, 1998.

Michael Himsolt; *Graphlet: Design and Implementation of a Graph Editor*; SP&E; pp. 1303-1324, 2000.

John Grundy, et al.; *Generating EDI Message Translations From Visual Specifications*; 0-7695-1426-X; pp. 35-42, 2001.

Guanglei Song, et al.; *Model Management Through Graph Transformation*; Proceedings of the 2004 IEEE Symposium on Visual Languages and Human Centric Computing (VLHCC'04); pp. 75-82, 2004.

Sebastian Bossung, et al.; *Automated Data Mapping Specification Via Schema Heuristics and User Interaction*; Proceedings of the 19th International Conference on Automated Software Engineering (ASE'04); pp. 208-217, 2004.

J.C. Grundy, et al.; *Domain-Specific Visual Languages for Specifying and Generating Data Mapping Systems*; Journal of Visual Languages & Computing; pp. 243-263, 2004.

Octavian Patrascoiu; *Mapping EDOC to Web Services Using YATL*; Proceedings of the 8th IEEE Int'l Enterprise Distributed Object Computing Conf (EDOC 2004); pp. 286-297, 2004.

USPTO; Office Action for U.S. Appl. No. 11/134,993, filed May 23, 2005 in the name of Rishi Bhatia; 14 pages, Feb. 23, 2009.

Yannis Papakonstantinou, et al.; *QURSED: Querying and Reporting Semistructured Data*; ACM SIGMOD 2002; pp. 192-203.

USPTO; Office Action for U.S. Appl. No. 11/134,993, filed May 23, 2005 in the name of Rishi Bhatia; 16 pages.

USPTO; Notice of Allowance and Fee(s) Due for U.S. Appl. No. 11/134,993, filed May 23, 2005 in the name of Rishi Bhatia; 10 pages.

\* cited by examiner

```
REM * Structure definitions
DEF Person AS PersonDef
DEF Car AS CarDef
DIM PersonCars_Document(10) AS xmlComponentDef
ARRAYCLEAR(PersonCars_Document)
    PersonCars_Document(0).comp_name = "PersonCars_Document"
    PersonCars_Document(0).comp_type = 1
    PersonCars_Document(0).comp_id = 0
    PersonCars_Document(0).comp_parent = 0
    PersonCars_Document(0).comp_level = 0
    PersonCars_Document(1).comp_name = "Person_Record"
    PersonCars_Document(1).comp_type = 1
    PersonCars_Document(1).comp_id = 1
    PersonCars_Document(1).comp_parent = 0
    PersonCars_Document(1).comp_level = 1
    PersonCars_Document(2).comp_name = "Id"
    PersonCars_Document(2).comp_type = 1
    PersonCars_Document(2).comp_id = 2
    PersonCars_Document(2).comp_parent = 1
    PersonCars_Document(2).comp_level = 2
    PersonCars_Document(3).comp_name = "Name"
    PersonCars_Document(3).comp_type = 1
    PersonCars_Document(3).comp_id = 3
    PersonCars_Document(3).comp_parent = 1
    PersonCars_Document(3).comp_level = 2
    PersonCars_Document(4).comp_name = "Car"
    PersonCars_Document(4).comp_type = 1
    PersonCars_Document(4).comp_id = 4
    PersonCars_Document(4).comp_parent = 1
    PersonCars_Document(4).comp_IsRepeating = TRUE
    PersonCars_Document(4).comp_level = 2
    PersonCars_Document(5).comp_name = "Make"
    PersonCars_Document(5).comp_type = 1
    PersonCars_Document(5).comp_id = 5
    PersonCars_Document(5).comp_parent = 4
    PersonCars_Document(5).comp_level = 3
    PersonCars_Document(6).comp_name = "Model"
    PersonCars_Document(6).comp_type = 1
    PersonCars_Document(6).comp_id = 6
    PersonCars_Document(6).comp_parent = 4
    PersonCars_Document(6).comp_level = 3
    PersonCars_Document(7).comp_name = "Year"
    PersonCars_Document(7).comp_type = 1
    PersonCars_Document(7).comp_id = 7
    PersonCars_Document(7).comp_parent = 4
    PersonCars_Document(7).comp_level = 3
    PersonCars_Document(8).comp_name = "Address"
    PersonCars_Document(8).comp_type = 1
    PersonCars_Document(8).comp_id = 8
    PersonCars_Document(8).comp_parent = 1
    PersonCars_Document(8).comp_level = 2
```

FROM FIG. 5A

```
REM * End of structure definitions
*
*
*

REM *
REM * Connect to data sources and targets
REM *
CONNECT PersonProfile ()
CONNECT CarProfile ()                          } 509
CONNECT PersonCars_DocumentProfile ()

Person_Done = FALSE

REM * Request/query the result set to transfer

PersonQuery = "SELECT P.id, P.name, P.address FROM JohnsTestDatabase.dbo.Person" +
"P"
SEND PersonProfile (#sql PersonQuery) ⟵510

DO WHILE FALSE = Person_Done
   returnValue = LOAD PersonProfile (#data Person) ⟵512
   IF _IPRET_SUCCESS <> returnValue THEN
     Person_Done = TRUE
     IF _IPRET_NO_DATA_AVAIL = returnValue THEN
       IF 0 = PersonCount THEN
         MESSAGE("No rows read")
       ELSE
          MESSAGE(PersonCount, "total rows read from Person")
       END IF
       STRUCTCLEAR(Person)
       REM * DO NOT PROCESS THE LAST (NULL) RECORD
       CONTINUE
     ELSE
       MESSAGE("LOAD returned", returnValue, "at line", ERL())
       CONTINUE
     END IF
   ELSE
     PersonCount = PersonCount + 1
   END IF Car_Done = FALSE REM * Request/query the result set to transfer
   CarQuery = "SELECT C.make, C.model, C.year FROM JohnsTestDatabase.dbo.Car" +
"C WHERE" + TOSTRING(Person.id) + "= C.id"
     SEND CarProfile (#sql CarQuery) ⟵510
     DO WHILE FALSE = Car_Done
        returnValue = LOAD CarProfile (#data Car) ⟵512
        IF _IPRET_SUCCESS <> returnValue THEN
          Car_Done = TRUE
          IF _IPRET_NO_DATA_AVAIL = returnValue THEN
```

FROM FIG. 5B

```
        IF 0 = CarCount THEN
            MESSAGE("No rows read")
         ELSE
            MESSAGE(CarCount, "total rows read from Car")
         END IF
         STRUCTCLEAR(Car)
         REM * DO NOT PROCESS THE LAST (NULL) RECORD
         CONTINUE
      ELSE
         MESSAGE("LOAD returned", returnValue, "at line", ERL())
         CONTINUE
         END IF
      ELSE
         CarCount = CarCount + 1
      END IF PersonCars_Document(5).comp_value = Car.make
      PersonCars_Document(6).comp_value = Car.model
      CONVERT(Car.year, PersonCars_Document(7).comp_value)

returnValue = STORE PersonCars_DocumentProfile (#data PersonCars_Document,
                                                      #create TRUE,
                                                      #map_type TRUE,
                                                      #mode PersonCars_DocumentStoreMode, #file
   "C:\\My Documents\\XML\\PersonCars_Document.xml", #repeating_element_index 4)
      IF _IPRET_SUCCESS <> returnValue THEN
         MESSAGE("STORE returned", returnValue, "at line", ERL())
      ELSE
         PersonCars_DocumentCount = PersonCars_DocumentCount + 1
      END IF
   LOOP CONVERT(Person.id, PersonCars_Document(2).comp_value)
   PersonCars_Document(3).comp_value = Person.name
   PersonCars_Document(8).comp_value = Person.address returnValue = STORE PersonCars_DocumentProfile (#data PersonCars_Document,
                                                   #create TRUE,
                                                   #map_type TRUE,
                                                   #mode PersonCars_DocumentStoreMode, #file
"C:\\My Documents\\XML\\PersonCars_Document.xml")
   IF _IPRET_SUCCESS <> returnValue THEN
      MESSAGE("STORE returned", returnValue, "at line", ERL())
   ELSE
      PersonCars_DocumentCount = PersonCars_DocumentCount + 1
   END IF
LOOP REM * Disconnect
DISCONNECT PersonProfile ()
DISCONNECT CarProfile ()
DISCONNECT PersonCars_DocumentProfile ()
```

```
<PersonCars_Document>                               750
    <Person_Record>
        <id> 1 <id/>
        <Name> Jack Smith <Name/>
        <Car>
                <Make> Ford <Make/>
                <Model> Explorer <Model/>
                <Year> 1998 <Year/>
        <Car>
                <Make> Dodge <Make/>
                <Model> Ram <Model/>.
                <Year> 2000 <Year/>
        <Address> 125 Elm St, Smithsville, TX, 82671 <Address/>
    <Person_Record/>
    <Person_Record>
        <id> 2 <id/>
        <Name> Sue Jones <Name/>
        <Car>
                <Make> Buick <Make/>
                <Model> Le Saber <Model/>
                <Year> 1999 <Year/>
        <Car>
                <Make> Chevrolet <Make/>
                <Model> Impala <Model/>
                <Year> 2002 <Year/>
        <Address> 5 Main St, Crosstown, IA, 82671 <Address/>
    <Person_Record/>
<PersonCars_Document/>
```

*FIG. 7*

SYSTEM AND METHOD FOR DATA MANIPULATION

RELATED APPLICATIONS

This application claims the priority under 35 U.S.C. §119 of provisional application serial number 60/659,264 filed Mar. 7, 2005.

TECHNICAL FIELD OF THE INVENTION

This disclosure relates generally to the field of data processing and, more particularly, to a system and method for manipulating data.

BACKGROUND OF THE INVENTION

In the rapidly-evolving competitive marketplace, data is among an organization's most valuable assets. Business success demands access to data and information, and the ability to quickly and seamlessly distribute data throughout the enterprise to support business process requirements. Organizations must extract, refine, manipulate, transform, integrate and distribute data in formats suitable for strategic decision-making. This poses a unique challenge in heterogeneous environments, where data is housed on disparate platforms in any number of different formats and used in many different contexts.

SUMMARY OF THE INVENTION

In one embodiment of the invention, a system for data manipulation includes a mapper module operable to receive a first data format of a source file, receive a second data format of a target file, and automatically generate a script to represent a movement of data from the source file to the target file. A server is operable to execute the script, a first interface module is coupled to the source file and is operable to load the data in accordance with the script, and a second interface module is coupled to the target file and is operable to store the data in accordance with the script.

Some embodiments of the invention provide numerous technical advantages. Other embodiments may realize some, none, or all of these advantages. For example, a data extraction, transformation, and load tool features a flexible, easy-to-use, and comprehensive application development environment. A user does not have to have knowledge of XML to be able to practice embodiments of the invention. All the programming complexities of extracting, transforming, and loading data from disparate sources and targets may be hidden. There is no need to learn database-specific API's. Embodiments of the invention may facilitate seamless extraction and integration of data from and to AS/400, DB2, DB2 MVS, DBASE, Flat files, COBOL files, Lotus Notes, Microsoft ODBC, Microsoft SQL Server, Oracle, Sybase, Microsoft Access, CA Ingres and UDB.

Some features provide an ability to use XML document files as either source or targets, and the data can be transformed from XML format to relational database or flat file format, and vice versa. An XML scanner feature may automatically create the required metadata from an XML file. A database scanner feature may automatically create the required metadata from a database file. An XML definition editor may allow a user to fine tune this metadata and also to manually create new XML object definitions.

Other technical advantages are readily apparent to one skilled in the art from the following figures, descriptions, and claims.

BRIEF DESCRIPTION OF THE DRAWINGS

FIGS. 5A through 5C illustrate an example script according to one embodiment of the invention;

FIG. 7 is an example output of the script of FIGS. 5A through 5C according to one embodiment of the invention.

DETAILED DESCRIPTION OF EXAMPLE EMBODIMENTS

Figure 1:
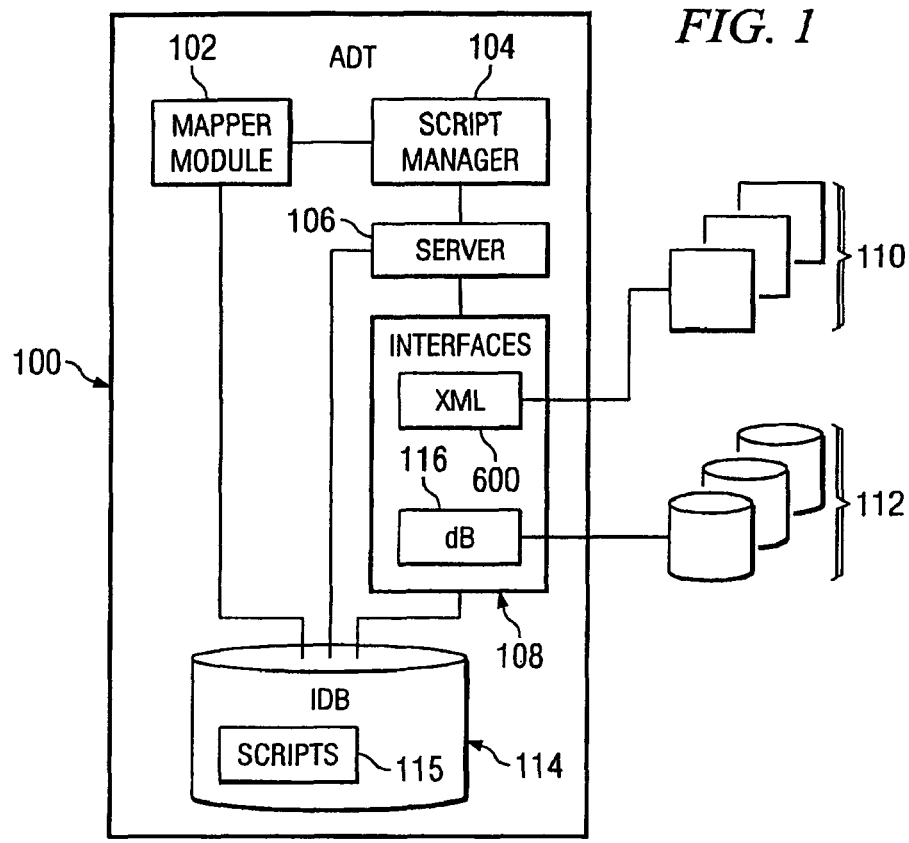
FIG. 1 is a block diagram illustrating a system for data manipulation according to one embodiment of the invention.

FIG. 1 is a block diagram illustrating a system 100 for data manipulation according to one embodiment of the invention. Generally, system 100 is a graphical data movement tool that may be sometimes referred to herein as Advantage Data Transformer ("ADT"). Some embodiments of the invention facilitate eXtensible Markup Language ("XML") functionality with an ability to use XML document files as either sources or targets and transform data from XML format into database format, and vice versa. Various embodiments of system 100 are described below in conjunction with FIGS. 1 through 7.

In the illustrated embodiment, system 100 includes a mapper module 102, a script manager 104, a server 106, interfaces 108, XML files 110, database tables or files 112, and an internal database 114. The present invention contemplates more, fewer, or different components associated with system 100 than those illustrated in FIG. 1. In addition, any of the elements or various functions of the elements of system 100 may be suitably distributed among one or more computers, servers, computer systems, and networks in any suitable location or locations. As such, any suitable number of processors may be associated with, and perform the functions of, system 100.

Mapper module 102 includes any suitable hardware, software, firmware, or combination thereof operable to receive a first data format (or object definition) of a source file, receive a second data format (or object definition) of a target file, and automatically generate a script 115 to represent a movement of data from the source file to the target file. As used herein, the term "automatically" generally means that the appropriate processing is substantially performed by mapper module 102. However, use of the term "automatically" further contemplates any suitable user interaction with mapper module 102. As described in greater detail below, mapper module 102 includes one or more suitable graphical user interfaces ("GUIs") and, among other functions, allows a user to design data formats, scan data formats from existing definitions, edit existing data formats, and design data transformation programs via drag-and-drop functionality. Further details of mapper module 102 are described below in conjunction with FIG. 2.

Script manager 104 includes any suitable hardware, software, firmware, or combination thereof operable to manage scripts 115 generated by mapper module 102. This may include storing scripts 115 in internal database 114 or other suitable storage location, and may include scheduling scripts 115 for execution by server 106. Script manager 104 may also provide database connection information to source tables and target tables through suitable database profiles. Database profiles may specify a particular interface, server name, database name, user ID, password, and file name for a particular program. Other functionalities performed by script manager 104 are contemplated by the present invention.

Server 106 includes any suitable hardware, software, firmware, or combination thereof operable to execute scripts 115 when directed by script manager 104. The transformation of data formats takes place in scripts 115 when executed by server 106. In other words, server 106 may perform the data movements from one or more source files to a target file. Other functionalities performed by server 106 are contemplated by the present invention.

In one embodiment, the flow between script manager 104 and server 106 is as follows: script manager 104 puts a script run request in a queue in internal database 114 when a user selects a script to run. A scheduler function within server 106 picks up the run request and verifies the script is valid to run. An interpreter function is started within server 106 to run script. The interpreter pulls compiled script from internal database 114 and starts interpreting (i.e., running) the script. The interpreter loads interfaces 108 during script execution. The interfaces 108 access tables/files based on the script. Messages from the script get logged in internal database 114. The scheduler logs script return code in internal database 114, and script manager 104 inspects internal database 114 logs for script messages and return codes. Script manager 104 can view the execution and message logs from internal database 114 to report on status and completion of script execution.

Interfaces 108, in the illustrated embodiment, include an XML interface 600 and a database interface 116. However, the present invention contemplates other suitable interfaces. Interfaces 108 include any suitable hardware, software, firmware, or combination thereof operable to load and store data in accordance with scripts 115 when called by server 106. Interfaces 108 are also coupled to source files and target files. For example, in the embodiment illustrated in FIG. 1, XML interface 600 is coupled to XML files 110 and database interface 116 is coupled to database tables or files 112. XML files 110 and database files 112 are representative of various data stored in various file formats and may be associated with any suitable platform, such as Windows NT, Windows 2000, Windows 2003, Windows XP, Linux, AIX, HP-UX, and Sun Solaris. The present invention contemplates interfaces 108 having other suitable functionalities. Further details of XML interface 600 are described below in conjunction with FIG. 6.

Figure 2:
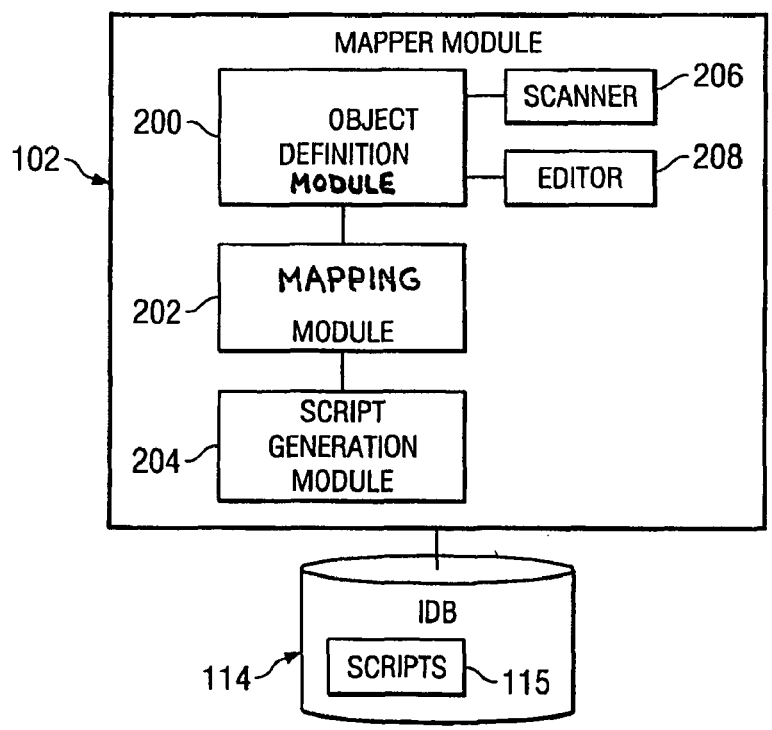
FIG. 2 is a block diagram illustrating a mapper module for data manipulation according to one embodiment of the invention.

FIG. 2 is a block diagram illustrating mapper module 102 according to one embodiment of the invention. In the illustrated embodiment, mapper module 102 includes an Object Definition module 200, a Mapping module 202, a Script Generation module 204, a Scanner 206, and an Editor 208. The present invention contemplates more, fewer or different components for mapper module 102 than those shown in FIG. 2.

Object Definition module 200, in one embodiment, is operable to receive a data format (or object definition) of a source file and/or a target file, which may be in an XML format, database format, flat file format, etc.. This may be accomplished in any suitable manner and may allow a user to define or design such data format. Two ways to define a particular data format may be via scanning with Scanner 206 or manually with the help of Editor 208. Pre-existing object definitions (i.e., file formats) may also be stored in internal database 114.

Scanner 206 is operable to automatically generate a data format from an existing definition that contains the desired file format. One example of such file format scanning is described in U.S. patent application Ser. No. 11/074,502, which is herein incorporated by reference. Other suitable file format scanners are contemplated by the present invention, such as a database table scanner, a flat file scanner, COBOL definitions scanner, etc. The manual definition of an XML document file format is shown and described below in conjunction with FIGS. 3A and 3B.

Mapping module 202 is operable to allow a user to design a transformation program via mappings to allow for the transformation of data from one or more source files to a target file. This may be accomplished via a GUI having a program palette in which a user is allowed to drag and drop source object definitions into a target object definition therein in order to perform the desired connection. Such a program palette is shown and described below in conjunction with FIG. 4. These graphical mappings by a user represents a desired movement of data from the source files to the target file.

Script Generation module 204 is operable to automatically convert the mappings captured by the Mapping module 202 into a script to represent the movement of data from the source files to the target file. An example script is shown and described below in conjunction with FIG. 5.

Figure 3A:
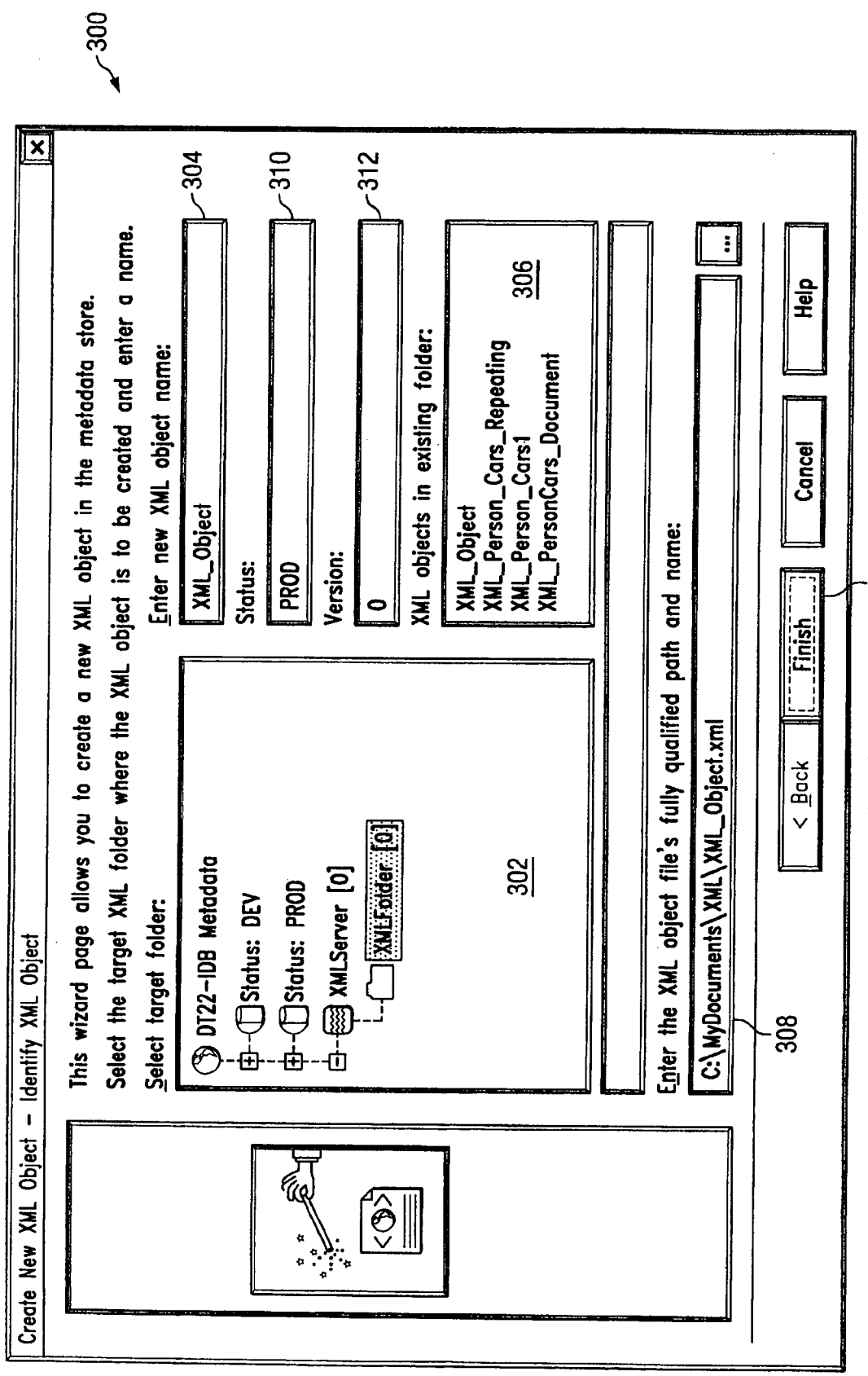
FIGS. 3A and 3B are example screen shots illustrating some functionality of an XML Object Definition of the mapper of FIG. 2.
Figure 3B:
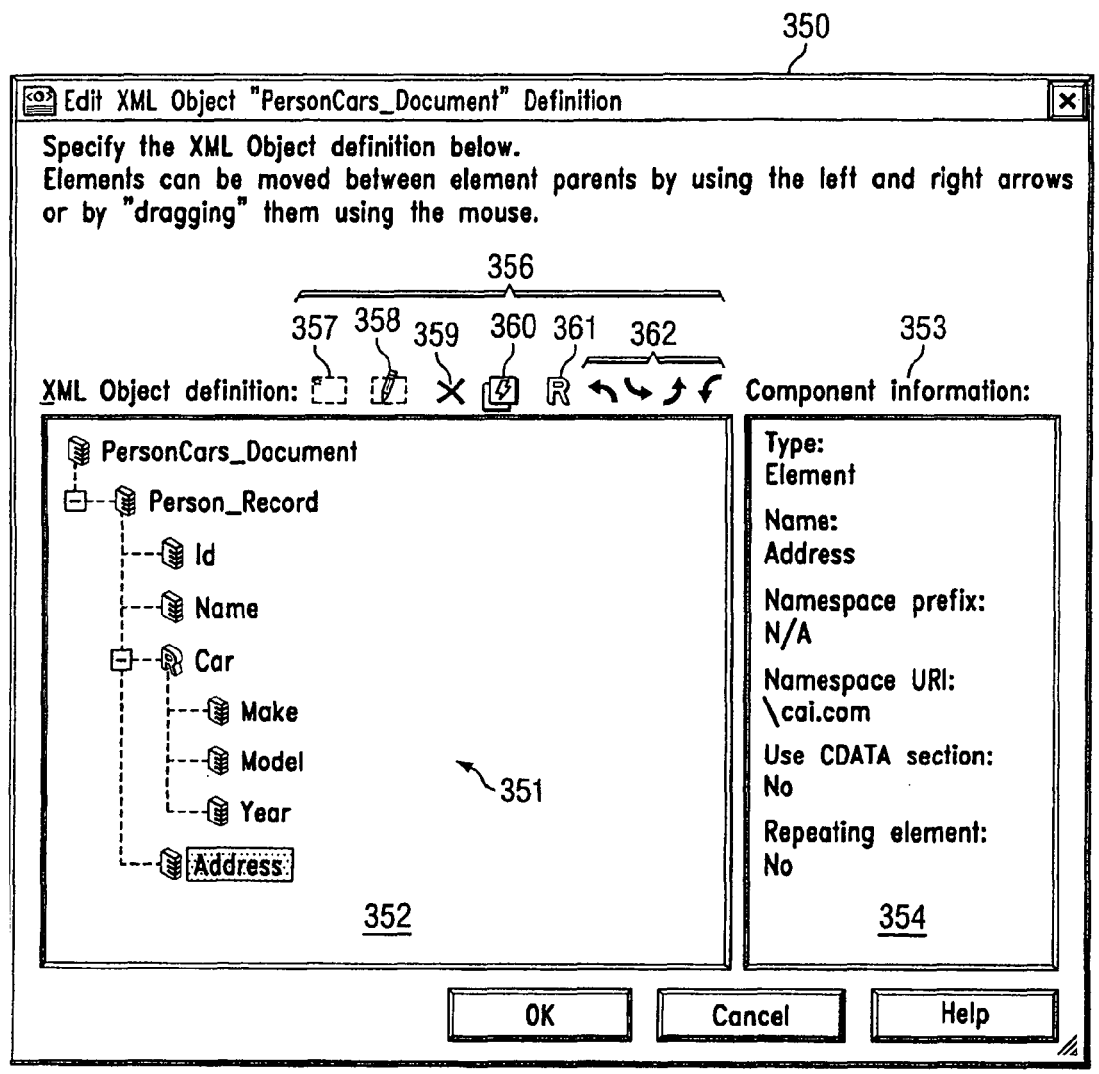

FIGS. 3A and 3B are example screen shots illustrating some functionality of Object Definition module 200 according to one embodiment of the invention. Referring first to FIG. 3A, a "Create New XML Object" dialog 300 is illustrated. Dialog 300 allows a user to create a new XML object. The user may select the target folder where the XML object is to be created by using a window 302. A browser tree may be associated with window 302 from which a user may select a desired XML folder. A name for the new XML object may be entered into a window 304. A list of existing XML object in the selected folder may be displayed in a window 306 to aid the user when defining the name of an XML object. The XML object's fully qualified path and name may be shown in a window 308. Other suitable windows may be associated with dialog 300, such as a status window 310 and a version window 312. Once all the desired information is entered into dialog 300, a user clicks on a Finish button 314 to create the XML object. Object Definition module 200 then launches an "XML Object Definition" dialog 350, as illustrated in FIG. 3B below.

XML Object Definition dialog 350 allows a user to define elements, attributes, namespaces, comments, etc. that define the layout of an XML object that may be later used as a source or target on a program palette. The XML Object definition defines the layout of the object and controls how the data is read/written when used in a program. In the illustrated embodiment, dialog 350 illustrates an XML file format 351 in a window 352 for the PersonCars_Document file that is shown in the Create New XML Object dialog 300 above. The XML Object Definition dialog 350 allows a user to create and/or modify XML components of an XML object that include elements, repeating elements, attributes, namespaces, and comments. An icon with a particular letter or symbol may be displayed for each component in XML file format 351. In the illustrated embodiment, an "E" used to illustrate an element type, an "R" is used to illustrate a repeating element type, an "A" is used to illustrate an attribute of an element, an "N" is used to illustrate a namespace, and an "!" is used to illustrate a comment. Other suitable designations are contemplated by the present invention.

Component information 353 about a particular component in file format 351 is displayed in a component information window 354 as a user moves a cursor over a particular component or when a user selects a single item in file format 351. Component information window 354 shows component information, such as the type, name, value, namespace prefix, namespace URI, use CDATA, and whether or not it is a repeating element. There exists a document root element in any particular XML file format. A document root element may created by default when the XML object is created for the first time. A user may modify the properties or the document root element but may not remove it.

Dialog 350 may have a number of suitable operations 356 associated therewith. A "New" operation 357 invokes an XML component dialog to create a new XML component using the currently selected element or element parent. An "Edit" operation 358 invokes an XML component dialog to edit an existing XML component. In this case, the XML file format 351 may be synchronized with the updated component data. It should be noted also that other suitable editors for modifying tables, flat files, and other suitable file format object definitions are contemplated by the present invention.

A "Delete" operation 359 deletes the selected component and children, if desired. Deleting an element, for example, may result in deleting other XML components, such as children elements, attributes, comments, or namespaces. A "Validate XML file format" operation 360 performs validation of a current file format 351. Any suitable routine may perform the following checks for a particular file format and may report the appropriate results and select the offending component in the file format for further correction.

1. Checks that the namespace prefixes are correct for scope and ensures the following errors don't exist: a) namespace prefix is not defined for definition scope of one or more element or attributes; and b) element is implicitly using the default namespace and the default is no-longer defined.
2. Checks that the namespace URIs are correct for scope and ensures the following errors don't exist: a) namespace URI differs (not in sync) for the namespace defined in current definition scope of one or more element or attributes; b) element is implicitly using the default namespace the URI differs (not in sync) with the default namespace defined for current scope of element; and c) element is implicitly using the default namespace and there is no default namespace defined for the current scope of element.
3. Checks that the XML component names are valid and do not contain invalid characters.
4. Checks that the XML component names are unique for the scope under which they are defined.
5. Performs special tests for element names. The following are some example rules for element names and repeating element designations: 1) second level (record) qualified element names should be unique; and 2) duplicate qualified element names are allowed for children or descendents (3rd or lower level) of second level elements if they are not designated as "repeating".
6. Checks to see if an XML file format contains valid second level elements. The definition may be invalid if it contains two or more second level elements and has repeating elements designated.

Other suitable validation checks are contemplated by the present invention. A "Repeating Element" operation 361 is used to designate an element as repeating or not repeating. The handling of repeating elements is described in further detail below. "Movement" operations 362 move a single or group of components in a particular direction within file format 351.

Other suitable operations are contemplated by the present invention for XML Object Definition dialog 350. For example, a user may drag and drop one or more elements or comments in a single operation. In addition, a context menu or other suitable menu may be shown when a user right clicks on components of file format 351. This menu may have suitable menu items that are comparable to the operations 356 discussed above.

Figure 4:
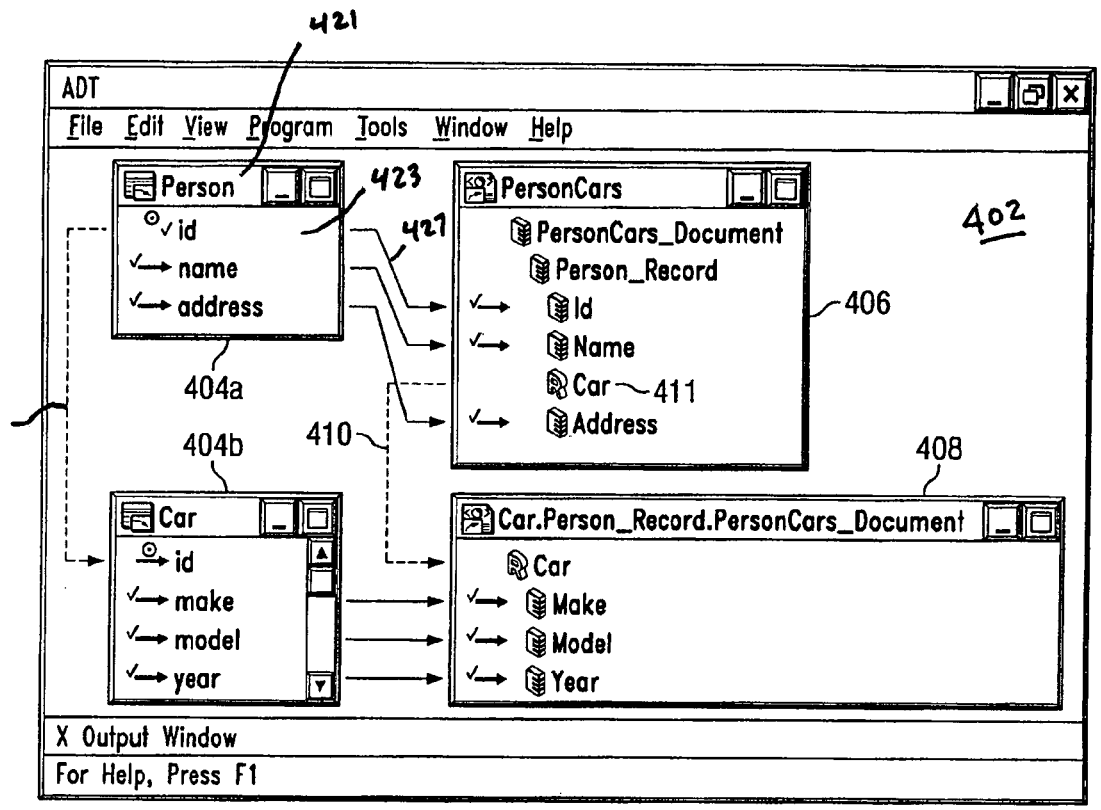
FIG. 4 is an example screen shot illustrating some functionality of a Mapping module of the mapper of FIG. 2.

FIG. 4 is an example screen shot 400 illustrating some functionality of Mapping module 202 according to one embodiment of the invention. Screen shot 400 includes a GUI with a program palette 402 that allows a user to design a desired movement of data from one or more source database tables 404 to a target main object definition 406 using one or more graphical mappings. The graphical mappings are first facilitated by a simple dragging and dropping of object definitions into program palette 402. For example, in the illustrated embodiment, source tables 404a, 404b are dragged-and-dropped into program palette 402. In addition, a main object definition 406 is dragged-and-dropped into program palette 402.

With reference to source table 404a, a title bar 421 is the top portion, or head, of a palette object window and identifies whether the object is a source or target via a unique name used on the palette. It may also be identified by different colors depending on whether it's a database table or an XML document file. A main body 423 is the "inner" area of source table 404a that lists the column names, view, or record. A column is the smallest entity in a metadata table definition. In records, a column is called a "field." This attribute designates a field in a structure generated in a script as a key for locating database rows, records, or documents. Column names with regular font, e.g., may indicate no special primary or foreign key relationship exists. Bold column names, e.g., may indicate primary key columns. Primary keys have corresponding foreign key column in tables that are in dependent child relationship to the table with the primary key. Italic bold column names, e.g., may indicate indexed or foreign key columns. Foreign keys have corresponding primary key column in tables that have parent relationship to the table with the foreign key.

A mapping or single-use transformation line 427 connects sources and targets (tables and/or XML files) and show data relationships and the flow of data movement. These lines also may show that the data copy is limited by specific criteria, or that the data is being changed.

Reusable and Lookup Transformation Examples

The following examples show how reusable and lookup transformations are displayed on a program palette. The characteristics of reusable and lookup transformations are very similar in how they are used in a program.

The following graphic shows a reusable transformation, which takes multiple input values from source Cities table to create a CityBlockID value, stored in the target CityBlocks table.

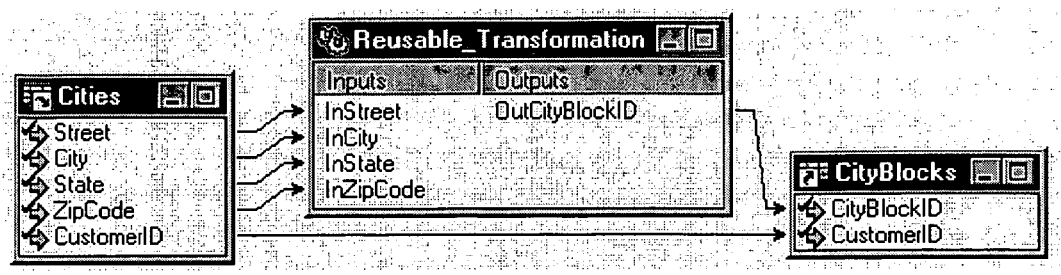

The following graphic shows a lookup transformation used to generate state IDs based on looking up zip code values from the source table.

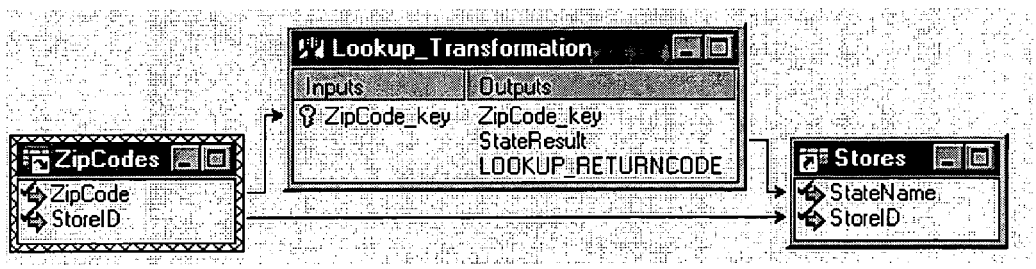

| Palette Object | Description |
| --- | --- |
| Title bar | The top portion, or head, of the transformation's window. The icon to the left of the name and the title bar's color may indicate whether the window is a Reusable Transformation or Lookup Transformation. The title bar's color may be set on a Preferences Color tab. |
| Inputs, Outputs | This is the main body or "inner" area of the transformation window that lists the inputs and outputs to the transformation. |
| Reusable Transformations | |
| | Data is passed to or from Reusable Transformations by defining single-use transformations between source and target columns to or from the inputs and outputs of the Reusable Transformation. Inputs are displayed on the left side and outputs are displayed on the right side of the Reusable Transformation. |
| Lookup Transformations | |
| | Lookup Transformations are composed of a set of keys and corresponding values, which are maintained in memory during the execution of the Program. The key and values can be saved to a file for future use and continuity across script executions. Keys are displayed in the left side and values are displayed on the right side of the Lookup Transformation. |

Individual "fields" from source tables 404a, 404b are mapped to individual elements in main object definition 406. As indicated by the arrows in program palette 402, the "id" field in source table 404a is mapped by the user to the "Id" element in main object definition 406, the "name" field in source table 404a is mapped to the "Name" element in main object definition 406, and the "address" field in source table 404a is mapped to the "Address" element in main object definition 406. In this example, a car element 411 in main object definition 406 is designated as a repeating element and has its own repeating element definition 408. Thus, there are mappings from source table 404b to repeating element definition 408. Any suitable mappings are contemplated by the present invention and are controlled by the desires of the user.

A connection indicator 410 indicates that main object definition 406 and repeating element definition 408 are related and also shows the dependency between elements and the direction of the dependency. Connection indicator 410 may also maintain and enforce the correct process order for the parent/child relationships between components on program palette 402, and may enforce the correct process order when the order is manually updated in a suitable process order dialog. In one embodiment, a user may be prohibited from deleting connection indicator 410.

In the embodiment illustrated in FIG. 4, source table 404a is a database table that contains the IDs, names, and addresses of persons, and source table 404b is a database table that contains the IDs, makes, models, and years of cars associated with those persons in source table 404a. The data in source tables 404a, 404b are desired to be transformed into an XML document that has a format defined by main object definition 406, which was designed above in conjunction with the Object Definition module 200. The example mappings illustrated in FIG. 4 are simple examples that illustrate the use of program palette 402 to perform graphical mappings that correspond to a transformation of data from one format to another format. Any suitable mappings are contemplated by the present invention and transformations from any suitable format to any other suitable format are contemplated by the present invention. For example, transformations may be desired from database tables to XML files, XML files to database tables, XML files to other XML files, database tables to other database tables, or other suitable transformations. Once the desired mappings are performed by a user, then script generation module 204 may then, in response to a selection by the user, automatically convert the mappings into a script to represent the movement of data from source tables 404 to main object definition 406. An example script 500 is shown and described below in conjunction with FIG. 5.

Thus, main object definition 406 and repeating element definition 408 on program palette 402 allow a user to graphically see the implied DO WHILE loops and corresponding LOAD/STORE units of work that may be generated in the script. Repeating element connections, as indicated by connection indicator 410, show control sequence of execution operations and corresponding execution loops.

In addition, this construct may allow a user to control how each repeating element object definition may be processed in a program and resulting script. Handling of multiple repeating elements in a single XML object definition may require having separate LOAD/STORE loops for each repeating element. The user may create as many repeating element object definitions as necessary to correctly process the XML object definition.

Mapping module 202 supports other suitable operations and/or mapping gestures for adding, deleting, and modifying object definitions defined in a transformation program. Mapping module 202 also contains special operations for selecting, updating, and moving objects on program palette 402. In addition, it includes a unique "Generate Layout" feature that arranges the palette objects for main object definition 406 and repeating element definition 408 using non-overlapping hierarchical representation as defined in XML file format 351 (FIG. 3B). This feature is useful for automatically generating a layout that shows the parent/child relationships (DO/WHILE LOOPS) and hierarchy without using dialog 350 as a reference.

FIG. 5 illustrates an example script 500 according to one embodiment of the invention that is generated by script generation module 204 (FIG. 2). As described above, during a transformation program design via the graphical mappings, a user drags various source object definitions and target object definitions onto a program palette where they are displayed. In one embodiment, each definition is represented as a C++ object called a "ipm_SetDoc", which includes information about whether the file is a source or a target, whether the data is a table in a relational database or an XML file, and what columns or elements participate in the transformation. When the user maps a column or element of one source to a column or element of a target, for example, it is represented internally as an "ipm_Connection" object.

During script generation, the information in the "ipm_SetDocs" and "ipm_Connections" is translated into "ipcg_Node" and "ipcg_DocRef" objects, respectively. Whereas the first two objects represent the appearance of the program on the program palette, the last two better represent the processing implied by that appearance. A list of "ipcg_Nodes" and "ipcg_DocRefs" are then used to create an array of "sgenunit" structures, which represent such granular pieces of processing as CONNECTing to a database table, starting a DO WHILE loop to LOAD a row of a source table, assigning the value of one script variable to another, STOREing a row to a target table, or terminating a DO WHILE loop.

Finally, a number of passes are made through the array of "sgenUnits" to write out actual script statements to define the standard script constants, script structures to hold table column values, data profile names, and the actual CONNECT/ DO WHILE/LOAD/IF/assignment/STORE/DISCONNECT processing statements.

Referring now to FIG. 5, example script 500 includes at least an XML structure 502 and a transformation routine 504. Description of the source table structure is not explicitly shown below; however, it would be similar to XML structure 502 but with less attributes. The XML structure 502 is how an XML file format or object definition is defined within the programming code. Whereas LOAD and STORE handlers for other interfaces, such as database interface 116, take a #DATA parameter that specifies a structure within which each field corresponds to a column within a database table, the #DATA parameter for XML LOAD and STORE handlers specifies an array of structures. Each of the structures in the array corresponds to an element, attribute, namespace, or comment specified in the XML document. Generally, the structure looks like this:

| TYPE xmlComponentDef AS STRUCTURE | |
|---|---|
| ( | |
| comp_name | STRING, REM* Element tag, attribute name, or null |
| comp_value | STRING, REM* character value of element or attribute |
| comp_type | INT, REM* 0=attribute,1=element, 2=namespace,3=comment |
| comp_id | INT, REM* id of the component |
| comp_parent | INT, REM* id of the parent element-type component |
| comp_namespaceURI | STRING, REM* full URI of namespace |
| comp_NS_Prefix | STRING, REM* prefix for namespace qualification |
| comp_IsCDATA | BOOLEAN, REM* TRUE = data to be wrapped in CDATA tags |
| comp_datatype | INT, REM* datatype of element for Web Service call |
| comp_IsRepeating | BOOLEAN, REM* TRUE = element may repeat |
| comp_level | INT, REM* level of the component |
| ) | |
| CONST_comptype_attribute = 0 | |
| CONST_COMPTYPE_ATTRIBUTE = 0 | |
| CONST_comptype_element = 1 | |
| CONST_COMPTYPE_ELEMENT = 1 | |
| CONST_comptype_namespace = 2 | |
| CONST_COMPTYPE_NAMESPACE = 2 | |
| CONST_comptype_comment = 3 | |
| CONST_COMPTYPE_COMMENT = 3 | |

So the following might be used to define an XML file for a LOAD or STORE: DIM xmlObj(20) AS xmlComponentDef.

Here are some general comments about each of the general structure's fields.

| comp_name | simple name of element or attribute or text of comment |
|---|---|
| comp_value | character value of element or attribute |
| comp_type | 0 => element, 1 => attribute, 2 => namespace component, 3 => comment |
| comp_id | a unique number to identify a component; sequentially assigned starting with zero |
| comp_parent | id of the element component that this component belongs to |
| comp_namespaceURI | the Uniform Resource Identifier for the component's namespace |

-continued

| comp_NS_Prefix | prefix associated with the namespaceURI |
|---|---|
| comp_IsCDATA | On STOREs, used to indicate that the character value may contain problematic characters like <, >, ", ', or & |
| comp_IsRepeating | indicates an element may repeat zero or more times in the XML definition |
| comp_datatype | datatype of element for Web Service call |
| comp_level | indentation level of the component, starting with zero for the root element |

With respect to transformation routine 504, please note the following general comments about some of the communication handlers associated therewith. Since data is being transformed into XML format into an XML file, XML interface 600 (FIG. 1) is called by server 106 to help perform the transformation. Details of XML interface 600 and its associated communication handlers are described in greater detail below in conjunction with FIG. 6.

The CONNECT handler (see reference numeral 509) establishes a connection to XML interface 600 and references an XML profile. The SEND handler (see reference numerals 510) is called before the LOAD handler (see reference numerals 512), and prepares the XML interface 600 for the load. The SEND handler may also be used to specify version and encoding information for the "prolog" that gets written by the first STORE handler (see reference numeral 514). (E.g. <!xml version '1.0' encoding="UTF-8"?>). The LOAD handler 512 loads data from a source file into an XML structure instance that is passed by the script 500. The STORE handler 514 is used to create the specified target file from the target object definition that is passed by script 500 to XML interface 600. The DISCONNECT handler (see reference numeral 519)

With respect to the LOAD handler, #FILE may be used to specify the name of the file from which the XML document may be read. #WS_XML should not be specified (or it should be set to FALSE) to get the #FILE parameter to be used. #WS_XML may be used to specify that the data may be received from the Web Service caller. If #WS_XML is set to TRUE, the #FILE parameter is ignored. #DATA may be required to specify the array of structures that describe the XML document to be read. #repeating_element_index is used on the LOAD of a repeating element and specifies the element's index in the array of structures.

Special notes on the use of structure fields for the LOAD handler is as follows:

| comp_name | required for elements and attributes |
|---|---|
| comp_value | ignored and forced to NULL by the LOAD handler at the beginning of the load. May be set to the value contained in the document if it is contained in the document |
| comp_type | elements (0) and attributes (1) may be specified; namespaces (2) and comments (3) are ignored |
| comp_id, comp_parent and comp_level | all required |
| comp_namespaceURI | should be specified if the document contains them; otherwise should be left NULL or set to a null string ("") |
| comp_NS_Prefix | ignored |
| comp_IsCDATA | ignored |
| comp_IsRepeating | may be specified as TRUE if the element repeats; may be set to FALSE or left NULL otherwise |

With respect to the STORE handler, #FILE may be used to specify the name of the file to which the XML document may be written. See reference numeral 516, for example. #WS_XML should not be specified (or it should be set to FALSE) to get the #FILE parameter to be used. #WS_XML may be used to specify that the data may be sent to the Web Service caller. If #WS_XML is set to TRUE, the #FILE parameter is ignored. #DATA may be used to specify the array of structures that define the components of the XML document to be created. #repeating_element_index may be used on the STORE of a repeating element and specifies the element's index in the array of structures. Special notes on the use of structure fields for the STORE handler is as follows:

| | |
|---|---|
| comp_name | required for elements, attributes, and comments; namespace prefix name for namespaces |
| comp_value | optional for elements; required for attributes; ignored for namespaces and comments |
| comp_type, comp_id, comp_parent and comp_level | all required |
| comp_namespaceURI | ignored for elements, attributes, and comments; required for namespaces |
| comp_NS_Prefix | optional for elements and attributes. Optional for namespaces (leave NULL when specifying default namespace 'xmlns'). Ignored for comments |
| comp_IsCDATA | may be specified as TRUE if the element value is to be wrapped in CDATA delimiters. May be set to FALSE or left NULL otherwise |
| comp_IsRepeating | may be specified as TRUE if the element repeats. May be set to FALSE or left NULL otherwise |

Not all the elements or attributes contained in an XML file need to be represented in the array structure. However, leaving out an element means leaving out all of its "children" as well.

After the generation of script 500, script manager 104 (FIG. 1) stores script 500 in internal database 114 for later execution by server 106. Script manager 104 also schedules script 500 for execution by server 106. When server 106 is ready to execute script 500, it calls on XML interface 600 as shown and described below in conjunction with FIG. 6.

Figure 6:
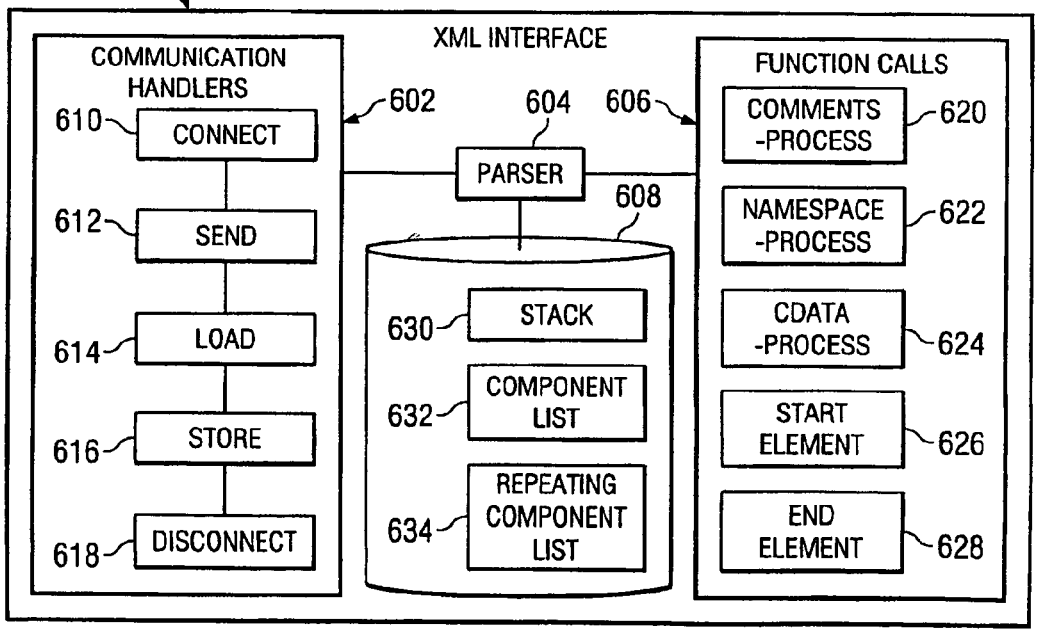
FIG. 6 is a block diagram illustrating an XML Interface for data manipulation according to one embodiment of the invention.

FIG. 6 is a block diagram illustrating XML interface 600 according to one embodiment of the invention. Due to the hierarchical nature of the data of an XML file, XML interface 600 may be slightly different than other interfaces, such as database interface 116. As described briefly above, rather than passing a structure where each structure field translates to a table column or file field, XML interface 600 may be passed by an array of structures. Each element of the array may correspond to an XML element or attribute. The array structure may contain the information required to format an XML file, and may be derived from the XML file format 351 as described above (FIG. 3B).

Because the array structure contains a name, XML elements may not be constrained by script naming restrictions. The difference between XML interface 600 and other interfaces is that an XML file format may be changed in between the invoking of a particular communication handler, such as LOAD and STORE. This may allow variable XML files to be passed to the XML interface 600. For the STORE handler, XML interface 600 may simply traverse the array of structures and write out the structure to the file in XML format. For the LOAD handler, XML interface 600 may first parse until it locates an element corresponding to the root node of the record passed in and then may parse the XML file and try to map the elements and attributes encountered to their corresponding fields in the array structure. In one embodiment, XML elements or attributes that have no corresponding field may be discarded. Array fields that have no counterpart in the XML file may be left NULL.

In the illustrated embodiment, XML interface 600 includes a plurality of communication handlers 602, a parser 604, a plurality of finction calls 606, and a cache 608. The present invention contemplates more, fewer, or different components than those shown in FIG. 6.

Communication handlers 602 generally provide a common function set that enables Server 106 to interact with different databases or data formats. Communication handlers 602 may establish and terminate connections, issue queries and other suitable commands, and move data to and from a database or other suitable data repository. A particular interface converts these common script functions into database-specific code. In the illustrated embodiment, communication handlers 602 include a CONNECT handler 610, a SEND handler 612, a LOAD handler 614, a STORE handler 616, and a DISCONNECT handler 618.

Generally, CONNECT handler 610 allows the connection to XML interface 600 in order to connect with source files and target files when server 106 desires to execute a script. SEND handler 612 prepares XML interface 600 for a LOAD call by passing initial information to parser 604. This call may initialize the "XML file" object, and prepare the XML file to be a source file. LOAD handler 614 works in conjunction with parser 604 and may get into a parse next ( ) loop until the end of a record is reached. At that point, parsing may wait and the XML file format structure described above may be returned with the data portion filled in. STORE handler 616 may cause the passed array of element structures to be written to the XML file format or cache 608 depending on the type of element being processed. The structure may contain the field names, hierarchy information, and the data. XML interface 600 may run this structure and generate the indicated XML to the XML file associated with the profile. DISCONNECT handler 618 writes out any element tags that are still pending, frees any parser resources, closes the source and target files, and disconnects server 106 from XML interface 600.

Parser 604 may be any suitable computer program operable to read one data line at a time during the LOADing of data from a source file. Parser 604 makes particular calls to function calls 606 based on the data read in order to perform its functions. For example, function calls 606 may include a comments-process function call 620, a namespace-process finction call 622, a CDATA-process function call 624, a start element function call 626, and an end element function call 628.

A cache 608 may be any suitable storage unit or database and may take the form of volatile or non-volatile memory including, without limitation, magnetic media, optical media, random access memory, read-only memory, removable memory, or any other suitable local or memory component. In the illustrated embodiment, cache 608 includes a stack 630, a component list 632, and a repeating component list 634. Stack 630 functions to keep track of where parser 604 is in an XML tree structure. Component list 632 temporarily caches data from a particular source file or target file during a LOAD call and repeating component list 634 temporarily caches data for the repeating elements during a particular LOAD call.

A general flow, according to one embodiment of the invention, for XML interface 600 is as follows:

1. An array is run and the "value" in each structure is set to NULL.
2. An XML source file is parsed until the start of an element matching the name of the XML target file is reached. The XML target file name may correspond to the root element described in the array structure.

3. Parsing is stopped for the XML source file when the end of that element is reached.

4. In the parse routines, when an element or an attribute is hit, the array structure is run looking for the corresponding field. If the field is found, then the "value" member is set to the data in the XML element or attribute. If a corresponding field in the array structure is not found, then the element/attribute from the XML file is thrown away.

5. At the end of the parse, the array may be filled in with all matching values from the XML source file. All fields in the passed-in structure that were not found in the XML target file may be NULL. All elements/attributes found in the XML source file, but not found in the array structure may be discarded.

FIG. 7 is an example output of the execution of the script according to one embodiment of the invention. As indicated in FIG. 7, an XML file 750 is illustrated in which car data for particular persons are arranged in an XML format. This data was extracted from database tables, such as source tables 404a, 404b (FIG. 4).

Repeating Elements-Additional Information

Although the handling of repeating elements is described in some detail above, additional information is now provided. As described above, XML object definitions may have an additional "repeating" property added to an element in an XML object definition. This property is used to indicate if a particular element (and its children) in the XML object definition has data that repeats in the associated XML document. The repeating property of the element is later used when the XML object definition is added to a program (see, e.g., repeating element definition 408 in FIG. 4) to create "repeating element" XML object definitions for each element with the "repeating" property. Repeating element XML object definitions in a program provide the means of accessing a particular repeating element and its children for structure assignments in a script and processing distinct LOAD and STORE operations inside a program. This feature may provide the necessary control and flexibility in the transformation program to handle special LOAD/STORE processing required for the repeating data.

All elements in the XML definition except for the root element may be defined as repeating. The repeating property is not applicable to attributes, namespaces, and comments. The repeating property may be designated on child elements that are designated as repeating and so forth down the hierarchy as needed. They may be defined once on a single element in an XML object definition. A user may specify if an element is repeating or non-repeating in the XML Object Definition dialog (e.g., dialog 350 in FIG. 3B). The user may specify the repeating property from an XML Component dialog or directly from the element component in the XML Object Definition dialog via a context menu.

The main and repeating element XML object definitions are considered a single entity for LOAD and STORE processing. That is, a single XML definition structure is used in the script to set/get values in common memory for LOAD and STORE processing of the XML document stream.

Each repeating element object definition may allow operations to be performed, such as mappings, user constraints, and process order specification and may follow the existing rules consistent with other objects on the program palette, such as tables, records, and views. When a user drags and drops the XML object definition containing elements with the repeating property onto a program palette, the main XML object definition and all the associated repeating element object definitions are shown. For example, see FIG. 4 above.

The name of the palette objects for repeating element object definitions may be derived from the name of the main XML object definition. The main XML object definition may use the metadata store name. For example, "PersonCars" main XML object definition is the name of the XML object used in the metadata store. The repeating element object definition may use the element name for the repeated element object definition followed by the parent elements up to the document root in the main XML object definition with a period "." separating each name.

For example, "Car.Person_Record.PersonCar_Document" is the name derived for the repeating element object definition for the repeating Car element shown if FIG. 4. If the final name is not unique for the palette object, the current mechanism in place for other palette objects is used to make it unique by appending a number to the element name (e.g., Car2.Person_Record.PersonCar_Document). In general, the name of the palette objects regardless of type (tables, records, views, Reusable Transformations, Lookups, etc.) should be unique in a given program. The unique palette name is used to identify processing steps (LOAD, STORE, INVOKE) in a program and is what uniquely identifies operations in the process order dialog.

In the "Car.Person_Record.PersonCar_Document" repeating element object definition, the fully qualified path for the Car element to Person_Record (parent) and PersonCars_Document (grand parent) is shown in the palette object name. The fully qualified path uniquely identifies a repeating element object definition such that the user may differentiate between two or more repeated element object definitions with the same element name but have different parents. The user would be prevented from creating mappings and user constraints to/from the parent component for Car in the parent element of the repeating element object definition in this example. That is, mappings and user constraints may not be created on the Car element in the Person_Cars palette instance, they may be created on the Car element in the Car.Person_Record.PersonCar_Document repeating element object definition.

The format for repeating element object definitions is considered separate but implicitly associated with the repeating element definitions in a main XML object definition and may be visible in the context of the program palette. That is, the format maintained in the main XML object definition is used to define the corresponding repeating element object definitions on the program palette and "appear" as separate addressable palette objects from the users prospective. This approach keeps all the formats in a single location in the metadata store for the repeating element structure and reduces the amount of duplicated data that would be needed in an approach that uses separate repeating element XML object definitions in the metadata store.

When a user makes a modification to a main XML object definition, the program palette objects are updated to reflect the new structure. The program synchronization routines may recreate/restructure the main/repeating element object definitions while trying to maintain existing mappings and preserve existing repeating element definitions if possible. Synchronization of the XML object definitions occurs on program open, program import, and when XML objects are edited while programs are open.

The main and repeating element XML object definitions on a program palette allow the user to graphically see the implied DO WHILE loops and corresponding LOAD/STORE units of work that may be generated in the script. Repeating element connections show control sequence of execution operations and corresponding execution loops.

XML source or target files may not be joined together into a single READ operation, which is similar to rules for record objects. For XML source files, the repeating element connections between main and repeating element object definitions control the order and nesting level of the XML objects in process order. The order that is produced uses the same mechanism for controlling order of source tables (not joined), records, and views connected via a foreign key or user constraint. DO WHILE loops are nested for all the XML objects based on the repeating element connections.

For XML target files, the repeating element connections between main and repeating element definitions do not affect resulting process order or nesting levels. The main and repeating element definitions may be moved like any other target (table, record or views) based on the source mappings. The order that is produced uses the same mechanism for controlling order of target tables, records, and views on the mapping palette.

The LOAD and STORE calls generated in the script may have additional parameters and structures to uniquely identify each part of the XML object definition (main or repeating element) being processed for a particular LOAD and STORE call. This may be handled by passing the index of the "repeating element" to be processed as an additional parameter to the LOAD or STORE statements. A single profile may be used for the main and repeating-element XML object definitions on the program palette since they use the same script structure and memory for the "related" LOAD or STORE statements in the script. Note that the "PersonCars" (main) and "Car.Person_Record.PersonCars_Document" (repeating element) XML object definitions from above are handled using separate LOAD or STORE operations in the script.

An XML interface may save/stage the data for repeating child elements to cache both on LOAD and STORE calls in the script. STORE statements for repeating element definitions stage the data to the memory. When the main record is STOREd then all of its data, including the staged repeating elements, gets written to the XML target file. The LOAD process begins with the LOAD of the entire record. All of the non-repeating data for the root record is returned, while the data for repeating child elements is staged to a cache. On subsequent LOADs for the child portions, this data is extracted from cache and returned.

Repeating & Nested Repeating Data Movement

The next few paragraphs very briefly describe how the data movement of repeating elements/records & nested repeating records is handled by XML Interface 600.

XMLStore Support

To support repeating elements, repeating records, and nested repeating records, script 500 stores the repeating data first followed by the non-repeating data. First, it's determined what is being processed, the repeating record, repeating element or non-repeating data. This is determined by using the repeating index passed on the STORE call from script 500. Next, if a repeating record is being processed then the size of the record, meaning the start and end indexes of the record, is calculated. Repeating component list 634 maintains the list of all active repeating records being processed. On processing of every repeating record, repeating component list 634 is scanned to determine if the record is a member of this list (has been processed before);. If yes, then we can get the parent of the repeating record from repeating component list 634. On STORE of the main record, the non-repeating data is recorded in component list 632. And a call is made to STORE handler 616 to write out the XML record.

m_pRepRecordRoot stores the repeating record across multiple stores. Repeating component list 634 keeps track of repeating component reference list. This facilitates nested repeating records and elements. Member variables that keep track of repeating data m_pRecord, m_pRepRecordRoot, m_bIsRepRecordRootSaved, m_bWriteDocRoot, m_pRepCompRefList, m_nLastRepElementIndex, ip_RepCompRef, m_pRepCompRefList), and a new function FindNodeByLevelAndId.

So XML Store stores the data how it will eventually be written out. On STORE of nested repeating record, the STORE for nesting N, assuming N is the deepest nesting of data creates empty placeholders for all the nodes preceding this node. The placeholders are created for both repeating and non-repeating nodes, later when the data is eventually presented by script 500 the unprocessed nodes are searched and populated. This way the list structure is identical to how it will be eventually written out.

XMLLoad Support

The first main LOAD call caches all the non-repeatable and repeating groups of data. This data is cached for one record at the second level. The subsequent LOAD calls return the repeated data. m_bAnyLastSavedRepComp and m_pLastSavedRepComp may be used to keep track of repeated data.

The basic component list 632 is identical to the script Component Def structure. All the repeated data is added to the repeating component list 634. This approach is taken for ease of use because component list 632 can be traversed and searched with the CompId's which are unique. So if a record has multiple repeated data then the m_pRepElemList[1] represents the data value for the first repeated data, and m-pRepElemList[2] for the next data value for the second repeated data. This code keeps track of when the elements gets repeated, it also determines when the record gets repeated.

While processing a repeating record, a check for nested repeating record now scans for any nestings of repeating data. All repeating data has their own LOADs, a new member variable in the component STOREs a load id that corresponds to the LOAD number for which the repeating data is associated with. Parsing routines, while building the list, will set this variable and XMLLoad will only process the data if the Component Id's matches what LOAD number is to be processed next.

Any time a repeating record is parsed, the parsing routines add a new reference to repeating component list 634. The list maintains active repeating record references. This helps when the nesting unwinds, because on an EndElement call the parsing routines can establish if we are processing another layer of repeating data. Parser routines, in addition to maintaining the data in the component list, now also cache the data in pTempComponent. The use case below is an example: if the mapper def of source XML is

A
B
C

And the data occurs like

A
B
C
B
C

Then after processing the first value of C we should stop processing because the second B will be the value for the second LOAD. So cache B in a separate list to be used for the next load.

One important aspect of data movement is determining when the current load is finished. Use end of element for the last data element from the script structure to mark that the current load is done, and implemented additional checks for two use cases where the data occurrence is different from the one specified in the mapper definition.

Case 1: The last element may be omitted in the data.

Case 2: Example: if the mapper def of source XML is
A
B
C

And the actual data is:
A
A (then second marks beginning of second load)
B
C

So within a single LOAD when two A's in the data are encountered, the second A will be cached in the first LOAD. The script will return the data for the first LOAD. When the interface is called again for the second LOAD, then from the cache, element A will be created & context will be re-established & the normal processing will then continue.

Implement additional checks for last script element when it is nested. In EndElement, m_bOnlyProcessRemParents is set to TRUE when we have encountered the last script element in the data. But that last element can be nested. So the new logic sets m_bLoadDone to TRUE when the last element and all its parents have been processed.

Although the present disclosure has been described in detail, various changes, substitutions and alterations may be made hereto without departing from the sphere and scope of the disclosure as defined by the appended claims.

What is claimed is:

1. A system for data manipulation, comprising:
a processor;
memory for storing instructions configured to:
receive a first data format of a source file and a second data format of a target file, wherein at least one of the first data format and the second data format comprises an XML format;
display a source file element associated with the source file in a source file window and one or more target file elements associated with the target file in a target file window, wherein at least one of the target file elements is a repeating element;
display a connection indicator indicating a relation between the repeating element in the target file window and a repeating element window;
determine that a user dragged one or more source file elements in the source file window onto one or more target file elements in the target file window;
in response to determining that the user has dragged one or more source file elements in the source file window onto one or more target file elements in the target file window, generate a mapping between the one or more source file elements and the one or more target file elements; and
based on the mapping, automatically generate a script to represent a movement of data from the first data format to the second data format;

a server configured to execute the script;
a first interface module coupled to the source file and operable to load the data in accordance with the script;
a second interface module coupled to the target file; and
the memory configured to store the data in accordance with the script.

2. The system of claim 1, further comprising a script manager operable to schedule the script for execution by the server.

3. The system of claim 1, wherein the mapper module is operable to scan the first data format from the source file.

4. The system of claim 1, wherein the mapper module comprises a graphical user interface and is further operable to receive the first data format from a user via the graphical user interface.

5. The system of claim 1, wherein each of the first and second data formats is selected from the group consisting of an XML format, a database format, and a flat file format.

6. The system of claim 1, wherein the server is further operable to transform the data from the first format to the second format in accordance with the script.

7. The system of claim 1, further comprising an internal database operable to store the scripts.

8. The system of claim 1, wherein the first and second interfaces are further operable to repeat load and store steps, respectively.

9. The system of claim 1, wherein the mapper module is further operable to:
receive a second source file having the first data format;
display one or more second source file elements associated with the second source file in a second source file window; and
display a constraint line indicating a relationship between at least one source file element in the source file window and at least one second source file element located in the second source file window.

10. The system of claim 1, wherein at least one of the first data format and the second data format is received as a result of a user dragging a source file object definition or a target file object definition into a predetermined portion of a graphical user interface.

11. A method for data manipulation, comprising:
receiving, by using a processor, a first data format of a source file and a second data format of a target file, wherein at least one of the first data format and the second data format comprises an XML format;
displaying a source file element associated with the source file in a source file window and one or more target file elements associated with the target file in a target file window, wherein at least one of the target file elements is a repeating element;
displaying a connection indicator indicating a relation between the repeating element in the target file window and a repeating element window;
determining that a user dragged one or more source file elements in the source file window onto one or more target file elements in the target file window;
in response to determining that a user dragged one or more source file elements in the source file window onto one or more target file elements in the target file window, generating a mapping between the one or more source file elements and the one or more target file elements;
based on the mapping, automatically generating a script to represent a movement of data from the first data format to the second data format;
executing the script;
loading the data in accordance with the script;

and storing the data in memory in accordance with the script.

12. The method of claim 11, further comprising scheduling the script for execution by the server.

13. The method of claim 11, wherein receiving the first data format of the source file comprises scanning the first data format from the source file.

14. The method of claim 11, wherein receiving the first data format of the source file comprises receiving the first data format from a user via a graphical user interface.

15. The method of claim 11, wherein each of the first and second data formats is selected from the group consisting of an XML format, a database format, and a flat file format.

16. The method of claim 11, wherein the server is further operable to transform the data from the first format to the second format in accordance with the script.

17. The method of claim 11, further comprising storing the script in an internal database.

18. The method of claim 11, further comprising repeating the loading and storing steps.

19. The method of claim 11, further comprising:
receiving a second source file having the first data format;
displaying one or more second source file elements associated with the second source file in a second source file window; and
displaying a constraint line indicating a relationship between at least one source file element in the source file window and at least one second source file element located in the second source file window.

20. The method of claim 11, wherein at least one of the first data format and the second data format is received as a result of a user dragging a source file object definition or a target file object definition into a predetermined portion of a graphical user interface.

* * * * *